(12) United States Patent
Feddrix et al.

(10) Patent No.: US 7,491,466 B2
(45) Date of Patent: Feb. 17, 2009

(54) BATTERY WITH SIDE TERMINAL

(75) Inventors: Frank H. Feddrix, Westlake, OH (US);
Wayne E. Uren, Chesterfield, MO (US);
Kelvin B. Belle, Creve Coeur, MO (US)

(73) Assignee: Eveready Battery Company, Inc., St. Louis, MO (US)

( * ) Notice: Subject to any disclaimer, the term of this patent is extended or adjusted under 35 U.S.C. 154(b) by 573 days.

(21) Appl. No.: 11/145,395

(22) Filed: Jun. 3, 2005

(65) Prior Publication Data

US 2006/0275656 A1 Dec. 7, 2006

(51) Int. Cl.
*H01M 2/02* (2006.01)
(52) U.S. Cl. ...................................... 429/179
(58) Field of Classification Search ................. 429/179, 429/164
See application file for complete search history.

(56) References Cited

U.S. PATENT DOCUMENTS

| | | | |
|---|---|---|---|
| 3,220,888 A | 11/1965 | Moore et al. | 136/173 |
| 3,506,902 A | 4/1970 | Sullivan | 320/2 |
| 3,930,889 A | 1/1976 | Ruggiero et al. | 136/166 |
| 4,147,838 A | 4/1979 | Leffingwell | 429/1 |
| 4,489,268 A | 12/1984 | Beachy | 320/2 |
| 4,628,243 A | 12/1986 | Hodgman et al. | 320/2 |
| 4,965,507 A | 10/1990 | Smilanich et al. | 320/48 |
| 5,055,763 A | 10/1991 | Johnson et al. | 320/15 |
| 5,057,761 A | 10/1991 | Felegyhazi | 320/2 |
| 5,443,924 A | 8/1995 | Spellman | 429/65 |
| 5,532,080 A | 7/1996 | Mizoguchi et al. | 429/164 |
| 6,391,490 B1 | 5/2002 | Aoi et al. | 429/176 |
| 6,897,634 B2 | 5/2005 | Ramsden | 320/11 |
| 2004/0101747 A1 | 5/2004 | Bushong et al. | 429/163 |

FOREIGN PATENT DOCUMENTS

| | | |
|---|---|---|
| CH | 480739 | 10/1969 |
| EP | 1026761 A | 8/2000 |
| FR | 2073475 | 10/1971 |
| GB | 1135199 | 12/1968 |
| JP | 08096793 | 4/1996 |

*Primary Examiner*—Patrick Ryan
*Assistant Examiner*—Thomas H. Parsons
(74) *Attorney, Agent, or Firm*—Robert C. Baraona

(57) ABSTRACT

The invention is a battery with power output terminals on opposite ends of a battery and a power output terminal on the side wall of the battery that has the same polarity as one of the end power output terminals. The presence of the side terminal is indicative of a battery characteristic and allow a battery operated device requiring that characteristic to selectively use the battery when designed to use the side terminal and opposite polarity end terminal to provide energy to operate the device. Because the battery also has opposite polarity end terminals, the battery can be used in devices designed to use batteries of the same dimensions and having the same nominal voltage. The location of the side terminal can also be indicative of additional battery characteristics, allowing the selective use of batteries in devices based on various device requirements.

8 Claims, 1 Drawing Sheet

BATTERY WITH SIDE TERMINAL

BACKGROUND

This invention relates to a battery with power output terminals that allow selective use of the battery in a device based on the battery characteristics, particularly electrical characteristics such as discharge power output capability.

Battery powered devices require batteries with certain electrical characteristics in order to operate properly, and conditions that may arise within devices that are acceptable for some batteries types may be undesirable for others. In order to insure the proper combinations of battery types and devices, devices can be designed so only batteries with certain shapes or with selected dimensions within limited ranges will fit. The locations, configurations and sizes of the battery power output terminals and corresponding locations, configurations and sizes of electrical contacts in the devices can also be designed so that only certain battery types will make proper electrical contact when installed in devices. To facilitate this, standards (e.g., the International Electrotechnical Commission's IEC 60086 series International Standards and The American National Standards Institute's ANSI C18 series American National Standards) have been established to prescribe various standard battery types with fixed nominal voltages, dimensions and terminals. For many devices, batteries whose key dimensions and terminals fall within the specified ranges can be used interchangeably in devices, even though the batteries may contain cells using different electrochemical systems. For example, IEC R6 size batteries include $Zn/MnO_2$ batteries with aqueous $ZnCl_2$ electrolyte (R6), $Zn/MnO_2$ batteries with aqueous alkali metal hydroxide electrolyte (LR6), $Li/FeS_2$ batteries with organic electrolyte (FR6) and Li/CuO batteries with organic electrolyte (GR6). While R6 type batteries can often be used interchangeably in many devices, those of one electrochemical system may be preferred to those of another electrochemical system, due to differences in battery electrical characteristics. In recent years the trend in new battery operated portable consumer devices has been toward higher constant power devices and higher minimum voltages. Those devices requiring higher power from the batteries may not only require only certain battery chemistries for optimum performance, they may not operate at all with other battery types. Consequently, high power devices are sometimes being designed to use higher power batteries, often having higher nominal voltages, to avoid consumer confusion and dissatisfaction which might otherwise result from the use of lower power batteries. Examples of such high power devices include photographic flash equipment, video camcorders, portable computers, personal digital assistants and digital still cameras.

In order to allow for increased interchangeability while still preventing poor performance and dangerous conditions, battery and device designs have been altered to allow interchangeable use of batteries having different nominal voltages. For example, Aoi et al. (U.S. Pat. No. 6,391,490) disclose a device with a modified battery holder which allows the use of either two standard 1.5 volt batteries in series or a single 3 volt battery to be installed and used to operate the device. The 3 volt battery is the same size and shape as the 1.5 volt batteries, but the 3 volt battery has power output terminals located on one end and the side of the battery instead of on the two ends. While this allows use of two 1.5 volt batteries in series as an alternative to a single 3 volt battery, a special 3 volt battery, having the same terminals and dimensions as the 1.5 volt batteries, is required. However, these special 3 volt batteries can only be used in specially designed devices. The initially small market for the special batteries may be a disincentive to investing in the development and manufacturing of a new battery type.

Interchangeability of primary and secondary (rechargeable) batteries can be even more challenging, since there are additional considerations in designing rechargeable batteries and devices in which they are used. For example, if the device contains or can be coupled with a charger for recharging the batteries, it is generally desirable to either prevent the use of primary batteries or somehow prevent recharging if primary batteries are used, since recharging primary batteries can be dangerous. In the past, cylindrical rechargeable batteries with power output terminals on both ends have been modified by relocating one of the terminals from one end to the side of the battery and replacing the relocated terminal with a nonconductive covering. Examples are disclosed in U.S. Pat. No. 3,930,889 (Ruggiero et al.) and Japanese Unexamined Patent Publication No. JP 08-096,793 (Machida et al.). These examples can prevent charging of primary batteries of the same size if mistakenly installed in a device intended for rechargeable batteries. However, rechargeable batteries such as these cannot be used in devices designed to be powered by standard primary batteries with power output terminals on opposite ends.

Ruggiero et al., as well as Sullivan (U.S. Pat. No. 3,506,902), Beachy (U.S. Pat. No. 4,489,268), Smilanich et al. (U.S. Pat. No. 4,965,507), Spellman (U.S. Pat. No. 5,443,924) and Aoi et al. (U.S. Pat. No. 6,391,490) also disclose using an electrical contact on the side of a cylindrical rechargeable battery for the sole purpose of charging the batteries. This allows the use of either primary or rechargeable batteries in the same battery holders but avoids inadvertent charging primary batteries without a side contact. However, there is no way to distinguish batteries with particular characteristics (e.g., electrical characteristics such as high power output capability from other batteries of the same dimensions in order to allow use of only those batteries with the desired characteristic in certain high power devices.

Because 3 volt lithium batteries (such as $Li/MnO_2$ batteries) are capable of providing high power energy, many high power devices are designed to use them. These batteries have standard dimensions and terminals that are different from other battery types (e.g., 1.5 volt alkaline $Zn/MnO_2$ batteries) to prevent the user from inadvertently installing a battery that will not operate or may damage the device. However, there are other battery types, such as standard sized 1.5 volt $Li/FeS_2$ batteries, that are capable of providing the required power for some types of high power devices that are currently designed to use only 3 volt lithium batteries. The 1.5 volt batteries may be advantageous for other reasons, such as availability, cost and the ability to use 1.5 volt batteries in many other common consumer devices. It would be desirable to be able to use primary $Li/FeS_2$ and other high power battery types in high power devices, particularly readily available, standard sized batteries.

The prior art does not satisfactorily solve the problems of unnecessarily excluding primary batteries that are suitable for lower power devices from use in high power devices or enabling selective use of primary or rechargeable battery types having only desirable electrical characteristics in a device from among other battery types with similar terminals and dimensions.

In view of the above, an object of the present invention is to provide a primary or rechargeable battery that can be selectively used in a device based on the desired characteristics (e.g., electrical characteristics such as discharge power output) of the battery.

Another object of the invention is to provide a battery with standard (i.e., as defined in battery industry standards) nominal voltage and dimensions that can be selectively used in a device intended to use only a battery with particular electrical characteristics and can be also be used in any device designed to use batteries having the standard voltage and dimensions.

Yet another object of the invention is to provide a battery that provides improved interchangeability, is economical and convenient, and avoids user confusion.

SUMMARY

The above objects and advantages over the prior art, as well as others that will be recognized by the skilled artisan, are provided by the present invention.

Accordingly, one aspect of the present invention is directed to a primary battery with at least one primary electrochemical cell and at least two power output terminals. The battery has a first end, a second end and a side wall disposed between the first and second ends, a height, and a width that is smaller than the height. An electrically nonconductive covering is disposed on at least a portion of the side wall of the battery, a first end power output terminal having a polarity is disposed on the first end of the battery and has a longitudinal projection beyond the battery side wall, and a second end power output terminal having a polarity opposite that of the first end terminal is disposed on the second end of the battery. The second end terminal optionally has a longitudinal projection beyond the battery side wall; the optional second end terminal projection having a minimum width beyond the side wall that is larger than a maximum width of the first end terminal projection beyond the side wall. The battery also has an exposed side power output terminal, having a polarity the same as that of the second end terminal, disposed on the side wall of the battery, with portions of the electrically conductive covering disposed between the side terminal and both ends of the battery.

A second aspect of the invention is directed to a rechargeable battery with at least one rechargeable electrochemical cell and at least three power output terminals. The battery has a first end, a second end, a side wall disposed between the first and second ends, a height, and a width that is smaller than the height. An electrically nonconductive covering is disposed on at least a portion of the side wall of the battery and on a peripheral portion of the first end, a first end power output terminal having a polarity is disposed on the first end of the battery and comprises a longitudinal projection beyond the battery side wall, and a second end power output terminal having a polarity opposite that of the first end terminal is disposed on the second end of the battery. The second end terminal optionally has a longitudinal projection beyond the battery side wall; the optional projection has a minimum width beyond the side wall that is larger than a minimum width of the first end terminal projection beyond the side wall. The battery also has an exposed, recessed first side power output terminal having a polarity the same as that of the second end terminal is disposed on the side wall of the battery.

A third aspect of the invention is directed to a battery operated system including a primary battery and a device operated by the battery. The battery has a first end, a second end and a side wall disposed between the first and second ends, a height, and a width that is smaller than the height. An electrically nonconductive covering is disposed on at least a portion of the side wall of the battery; a first end power output terminal having a polarity is disposed on the first end of the battery and has a longitudinal projection beyond the battery side wall; and a second end power output terminal having a polarity opposite that of the first end terminal is disposed on the second end of the battery. The second end terminal optionally has a longitudinal projection beyond the battery side wall; the optional second end terminal projection has a minimum width beyond the side wall that is larger than a maximum width of the first end terminal projection beyond the side wall. The battery also has an exposed side power output terminal having a polarity opposite that of the first end terminal disposed on the battery side wall. The device has a first contact member capable of electrical contact with the first end terminal and a second contact member capable of electrical contact with the battery side terminal. The battery is able to supply energy for operation of the device through the device first and second contact members, and a charging current cannot be applied to the battery between the device first and second contact members.

A fourth aspect of the invention is directed to a battery operated system including a rechargeable battery and a device operated by the battery. The battery has a first end, a second end, a side wall disposed between the first and second ends, a height, and a width that is smaller than the height. An electrically nonconductive covering is disposed on at least a portion of the side wall of the battery, a first end power output terminal having a polarity is disposed on the first end of the battery and has a longitudinal projection beyond the battery side wall, and a second end power output terminal having a polarity opposite that of the first terminal is disposed on the second end of the battery. The second end terminal optionally has a longitudinal projection beyond the battery side wall; the optional projection has a minimum width beyond the side wall that is larger than a minimum width of the first end terminal projection beyond the side wall. The battery also has an exposed, recessed side power output terminal having a polarity the same as that of the second end terminal disposed on the side wall of the battery. The device has a first contact member capable of electrical contact with the first end terminal and a second contact member in electrical contact with the battery side terminal.

These and other features, advantages and objects of the present invention will be further understood and appreciated by those skilled in the art by reference to the following specification, claims and appended drawings.

Unless otherwise specified, the following definitions and methods are used herein:
(1) button battery means a battery with a shape similar to a button or coin and a height that is less than its diameter;
(2) cylindrical battery means a battery with a generally cylindrical shape and a height greater than its diameter;
(3) non-cylindrical battery means a battery with a generally non-cylindrical shape and a height greater than a width (e.g., a battery with an oval cross section perpendicular to the longitudinal axis);
(4) prismatic battery means a battery with more than one side, at least one of which has a generally planar shape, having a height greater than a width;
(5) battery end means a distal portion of the battery height;
(6) battery height means the maximum battery dimension parallel to a longitudinal axis of the battery;
(7) contact (electrical contact) means (a) an electrically conductive surface of a device for making electrical contact with a battery, and (b) an electrically conductive surface of a battery electrically connected to a positive or negative electrode in the battery for receiving a charging current from the device or for communications between the device and battery (e.g., measuring electrical characteristics of the battery or providing electrical signals to battery components);

(8) terminal (power output terminal) means an electrically conductive part of a battery, in electrical contact with a positive or negative electrode in the battery, for supplying electrical power to a device;

(9) exposed means visible from the outside of the battery;

(10) recessed terminal means that, if an imaginary plane is placed against an exterior surface of the battery, the imaginary plane will not contact the exposed surface of the terminal;

(11) device means an appliance that is operated by power supplied by a battery, or a charger for recharging a battery;

(12) standard battery means a battery having a nominal voltage, power output terminals and dimensions that meet the requirements of an international or national standard for batteries (e.g., IEC 60086 series International Standards and ANSI C18 series American National Standards); and

(13) terms such as above, below, under, top and bottom refer to spatial relationships between parts of a battery, device, etc., in a particular orientation, which will be evident from the context of the description.

Unless otherwise specified herein, all disclosed characteristics and ranges are as determined at room temperature (20-25° C.).

DESCRIPTION

Figure 1:
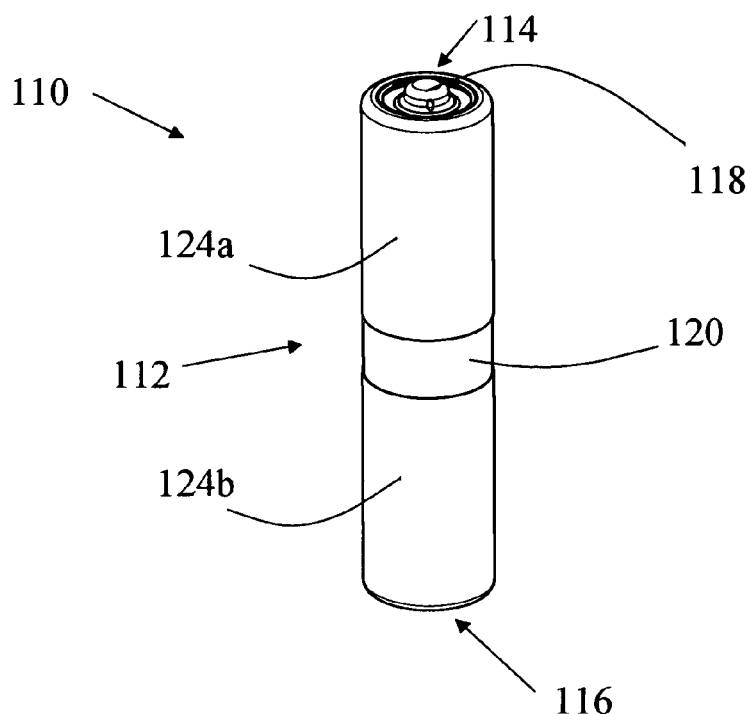
FIG. 1 is a perspective view of an embodiment of a cylindrical primary battery according to the invention.

One aspect of the invention is a primary battery, an embodiment of which is illustrated in FIG. 1. Battery 110 is a cylindrical AAA size Li/FeS$_2$ battery with a nominal voltage of 1.5 volts. The battery 110 has a side wall 112 extending between a top end 114 and a bottom end 116. A positive power output terminal 118 is located at the top end 114, projecting longitudinally upward beyond the side wall 112, and a negative power output terminal 120 on the side wall 112, extending around the circumference of the battery 110. In contrast to battery 110, a conventional FR03 type battery has a negative terminal on only the bottom end of the battery.

A device that is intended to be powered only by a battery according to the invention will have a negative contact positioned so it will only make electrical contact with the side negative contact of the battery. In this way, if a conventional battery having the same external dimensions as the battery in FIG. 1 is installed in the device, electrical contact will not be established between the negative contact in the device and the bottom negative terminal of the conventional battery because the side wall of the battery is electrically nonconductive or is electrically insulated from the bottom negative terminal.

Battery 110 has a second negative terminal (not shown) on the bottom end 116. In this way, battery 110 can not only be used to power a device with a negative terminal on the side, but it can also be used to power other devices designed to use batteries of the same nominal voltage and external dimensions but with terminals on both ends. This means that a single battery configuration can be used not only in devices that require certain electrical features not found in all batteries of a particular nominal voltage and dimensions, but also in devices that can use other batteries of the same nominal voltage and dimensions.

Battery 110 can be a battery with a portion of the side wall of a cell housing exposed between two portions of an electrically insulating jacket 124a, 124b, functioning as the negative terminal 120. The top and bottom portions 124a, 124b of the jacket serve to recess the side negative terminal 120 below the surface of the battery side wall to reduce the possibility of short circuits between the positive and side negative terminals 118, 120. Alternatively, a separate electrically conductive band positioned around the circumference of battery 110 can serve as side negative terminal 120. This alternative is useful when, for example, the side wall of the cell housing is not a conductive material or when a contact terminal with a more attractive appearance or greater corrosion resistance than can be achieved with the material of the cell housing is desired.

The side terminal 120 of battery 110 is positioned about midway between the top and bottom ends 114, 116. This can be advantageous for use in devices designed to accommodate battery 110 when installed with the positive terminal 118 facing in either of two opposite directions. The device can have two positive electrical contacts, one at each end of a battery compartment, so the positive terminal 118 will make electrical contact with one of the positive contacts and the device will operate properly, regardless of which way the positive terminal is facing. Because the negative terminal 120 is about midway between the ends 114, 116, only one device negative contact is required for making contact with the negative terminal 120.

Although battery 110 has the side terminal 120 positioned about midway between the ends 114, 116, other embodiments are possible with a side terminal positioned elsewhere on the side of the battery, either more toward the top end 114 or more toward the bottom end 116. To reduce the risk of external short circuits, it is generally desirable not to have the side terminal at the end of the side wall in close proximity to the opposite polarity end terminal; the farther the side terminal is from the opposite polarity end terminal the less the risk of an external short circuit. It can also be advantageous for the top portion of the jacket 124a to extend around the top end of the side wall 112 to cover a peripheral portion of the top end of the battery 110, as shown in FIG. 1, providing additional insulation to separate the opposite polarity side and top end terminals 120, 114.

Figure 2:
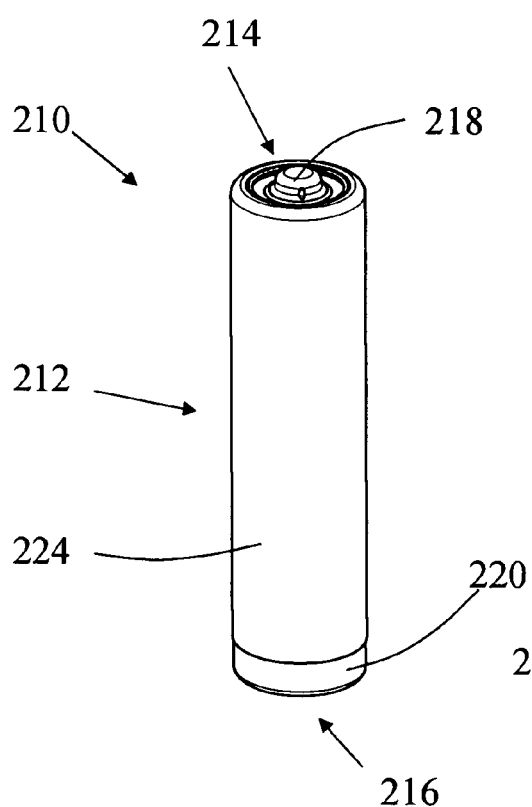
FIG. 2 is a perspective view of a second embodiment of a cylindrical primary battery according to the invention showing the top end of the battery.
Figure 3:
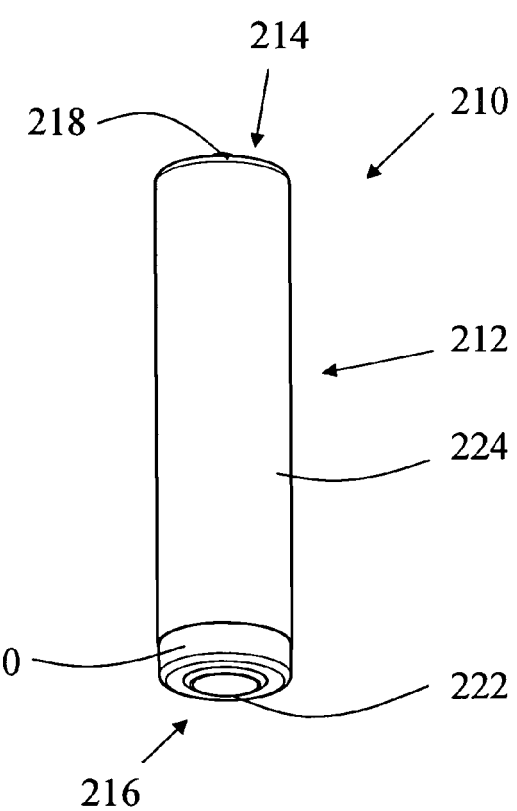
FIG. 3 is a perspective view of the battery shown in FIG. 2 showing the bottom end of the battery.

In one embodiment the side terminal may be located at the end of the side wall opposite the positive terminal, as in battery 210 (FIGS. 2 and 3). In FIGS. 2 and 3, features of battery 210 corresponding to features in battery 110 in FIG. 1 are identified with reference numerals that differ only in the first characters of the numerals from those in FIG. 1. In battery 210 the negative side terminal 220 is located in the lowermost portion of the battery side 212. In the embodiment shown battery 210 has a second negative terminal 222 at the bottom end 216 of the battery 210. When the side and bottom surfaces of the cell housing form the side and bottom negative terminals, respectively, no insulating jacket is required on the side 212 below the side terminal 220, so only one jacket member 224 is required, facilitating manufacturing.

In FIG. 3 the second negative terminal 222 projects longitudinally downward beyond the side wall 212; however, the second negative terminal 222 can be recessed inward even with the side wall 212. If it projects, the width (diameter) of this projection beyond the side wall 212 is preferably greater than that of the projection of the positive terminal 218 beyond the side wall 212. This allows the use of a recessed positive electrical contact in a device to prevent completion of a circuit including the battery 210 if the battery 210 is installed in the device backwards.

Preferred embodiments of the primary battery according to the invention are cylindrical batteries with positive and negative terminals on opposite ends of the battery as well as a negative terminal on the side of the battery. The side walls of the batteries can be substantially parallel to the batteries' longitudinal axes (i.e., parallel except for normal variations in manufacturing as well as curvature at the top and bottom ends of the side wall). The side terminal cooperates with devices intended to use only batteries capable of providing high power electrical energy to operate the device, allowing only such high power batteries with side terminals in particular locations to be used in the device. Examples of such batteries include batteries with a nominal voltage of 1.5 volts that meet the dimensional requirements for IEC R1, R03, R6, R14 and R20 size batteries and ANSI 25 size batteries, particularly Li/FeS$_2$ batteries (i.e., those that could be designated FR1, FR03, FR06, FR14, FR20 and 15LF types).

A second aspect of the invention is a rechargeable battery having power output terminals on opposite ends of the battery and another power output terminal, of the same polarity as one of the end terminals, on the side of the battery. This allows the selective use of rechargeable batteries with side terminals corresponding to required battery characteristics or ranges in devices, while also allowing the rechargeable battery to be used in other devices designed to use batteries of the same size but with opposite polarity terminals only on opposite ends of the battery. Such terminal configurations (e.g., the configuration shown in FIGS. 2 and 3) can also allow a rechargeable battery according to the invention to be interchanged with a primary battery according to the invention that is of the same size and has terminals in the same locations.

Various embodiments of the side terminal of a rechargeable battery are possible, including those described above for a primary battery according to the invention. For example, the side terminal can be a continuous band around the perimeter of the battery or comprise one or more windows in the jacket, the side terminal can also be located at different heights along the side of the battery, and the location of the side terminal can correspond to a particular electrical characteristic or range of the battery. The battery can also have more than one side terminal, and the location of each side terminal can correspond to a different characteristic or range.

A rechargeable battery according to the invention can be distinguished from a primary battery according to the invention. For example, a primary battery could have a side terminal in one location, while a rechargeable battery has a side terminal in another location; or the primary and rechargeable batteries could have a side terminal in the same location, while the rechargeable battery only has a side contact, for recharging the battery, in another location so a primary battery cannot be inadvertently recharged (e.g., in a device operated by the battery that also contains or can be connected to a charger).

A preferred rechargeable battery according to the invention is one with one or more cells each having a nominal voltage of from 1.2 to 1.5 volts. Examples include alkaline nickel/cadmium, alkaline nickel/metal hydride and lithium/iron disulfide cells.

The present invention, with either a primary or a rechargeable battery, can make selective use of more than one battery type, each having different characteristics. For example a battery having a side contact located midway on the side (see FIG. 1) might be a battery capable of delivering high power to a high voltage, while one with a side terminal at the lower end of the side wall (FIG. 2) might be capable of delivering somewhat lower power, but more than batteries with only a bottom negative terminal. Combinations of two or more side terminals, each in a pre-selected location on the battery side to distinguish batteries of different characteristics, could also be used. Electrical contacts in the device can be positioned to make contact with the negative terminals of only those battery types that are suitable for that device.

When a portion of the cell container is used as a power output terminal, the container may be a can made of any suitable material. Preferably the can is made from a metal that will provide sufficient strength, electrical conductivity and corrosion resistance, as well as an attractive appearance. Examples include steel, stainless steel, nickel and multilayer clad metal. The outside surface of the can may also be plated to improve any of these properties. In preferred embodiments of the batteries shown in FIGS. 1 to 3, the cell has a nickel plated steel can which may be further plated, polished or buffed to enhance the appearance of the negative terminals.

Any suitable jacket can be used on the battery. One example is one or more tubes of polymeric material, shrunk by heating around the desired portions of the battery. A preferred type of jacket is an adhesive-backed label, cut from a sheet of polymeric film with adhesive on one side, adhered to the outside of the cell housing. The sheet can include one or more layers of polymeric film and can optionally include a metalized layer to provide a metallic appearance. The film can also be printed with the battery type identification, terminal polarities and other information. Such a label can be applied in one or more layers around the battery. The top and/or bottom edges of the label can also be formed around peripheral portions of the end(s) of the battery, e.g., by molding, folding, heat-shrinking, etc. This is particularly desirable at the end of the battery with polarity opposite that of the side terminal for protection against external short circuits, especially when the opposite polarity end terminal has a peripheral flange with an edge located near the side of the battery. Another example of a suitable jacket is a metal jacket crimped over the peripheral portions of the ends of the battery. The metal jacket can be in the form of a metal sheet with electrical insulation between the metal sheet and the cells and with a nonconductive paint or other coating on the exterior surface of the metal sheet. Yet another example of a suitable jacket is a nonconductive material (e.g., paint or lacquer) applied directly to appropriate portions of the exterior surfaces of the cell container.

If desired, additional information about the battery, such as the electrochemical system or whether it is a primary or rechargeable battery, can be incorporated into the jacket. This can be done in any suitable manner. For example, special features that can be interpreted by a sensor in the device can be added to the jacket graphics, or a microchip with information about the battery can be placed on or within the jacket. Alternatively, one or more conductive bands, detectable by a sensor in the device, can be put onto an exterior surface of the jacket, insulated from the battery electrodes, the location(s) of the band(s) being characteristic of the battery type.

The side terminal of the battery is exposed prior to installation of the battery into a battery operated device, rather than relying, for example, on a device contact to pierce or cut through the label to make electrical contact with the terminal. This avoids the use of potentially dangerous sharp electrical contacts in the device and unreliable electrical contact between the device and the battery if the device contacts become dull from repeated use.

In an embodiment of a battery according to the invention, the label can initially cover the entire side wall of the battery and have a removable portion that can be taken off to expose the side terminal of the battery if the battery is to be used in a device requiring a battery with a side terminal, or it can be left in place to maximize protection against external short circuits if the battery is to be used in a device designed to use a battery without a side terminal. The removable portion of the label can be cut, perforated, coined, or otherwise weakened around its edges to facilitate separation without damaging the remaining portion(s) of the label. The label can also be made with no adhesive or a non-permanent adhesive on the removable portion to facilitate removal without leaving an adhesive residue that could interfere with good electrical contact between the battery side terminal and the corresponding device electrical contact. If the battery is a rechargeable battery with a side charging contact, the charging contact could also be initially covered by a removable portion of the label.

Alternatively, the side terminal can be incorporated into the structure of the battery structure. For example, the side terminal can be an exposed, electrically conductive segment in the jacket, in electrical contact with one of the battery electrodes.

The side terminals shown in FIGS. 1 to 3 are continuous bands around the entire perimeter of the battery, but the side terminals can instead be exposed within one or more openings that do not form a continuous band. An advantage of a continuous band is that special orientation around a longitudinal axis of the battery is not required to allow electrical contact between the terminal and corresponding device power input contact.

The batteries in FIGS. 1 to 3 are cylindrical batteries, but the invention can instead include non-cylindrical batteries, such as prismatic batteries. For example, the battery can have a square cross section perpendicular to a longitudinal axis. For a square battery the side terminal is preferably either a continuous band around the entire perimeter of the battery or comprises a terminal contact surface on each of the four sides of the battery so the battery does not have to be installed in a device with a single terminal contact surface facing the corresponding device contact.

Batteries of the invention can be single cell batteries, as described above, or they can be multiple cell batteries. A side terminal can be an exposed side of one of the cells, or it can be a separate electrically conductive component connected to one or more of the cells in an appropriate manner to provide the proper battery voltage. For a battery with two or more cells placed end to end in series, the end terminal will be electrically connected to one electrode of the cell on one end of the series and the side terminal will be electrically connected to the opposite polarity electrode of the cell on the opposite end of the series.

User replaceable batteries with terminals on opposite ends often have positive and negative terminals with different sizes or shapes to prevent improper installation and use in devices. In a preferred embodiment of the invention, the end terminal of the battery with polarity opposite the polarity of the side terminal has a projecting nubbin, such as those shown in FIGS. 1 to 3. The nubbin can cooperate with a corresponding recessed device contact to make electrical contact with the device while preventing contact with the wrong battery terminal, such as a larger diameter terminal of opposite polarity on the opposite end of the battery (see FIG. 3).

The side terminal of the battery can be either negative or positive. When the cell(s) have an electrically conductive side wall in electrical contact with an electrode, it can be convenient for the side terminal of the battery to have the same polarity as the side wall of the cell.

In addition to being a power output terminal, the side terminal can also serve other purposes. For example, it can be used as an electrical contact for sensing information about the battery (e.g., its voltage) by the device. A portion of the side terminal can even be used as a charging contact, in which case it is preferred that a means be provided for preventing inadvertent charging of a primary battery. One way to do this is by making the side terminal of a rechargeable battery wider than the side terminal of a primary battery of the same size, so that a device side charging contact offset toward one end of the battery from the device contact for making electrical contact with the side terminal will make contact with the side of the rechargeable battery but with only the nonconductive jacket of the primary battery. Preferably any rechargeable battery side charging contact will be separated from the battery side terminal by a portion of the jacket to prevent inadvertent charging of a primary battery with a side terminal.

A third aspect of the invention is a battery operated system comprising a primary battery, as described above, and a device with an electrical contact for contacting a side terminal of the battery to complete a circuit for providing electrical power from the battery to operate the device. The device contact for making electrical contact with the battery can be positioned so that it will only make contact with the battery side terminal if the battery is properly installed in the device, the battery has a side terminal and the side terminal is located in a particular portion of the side wall of the battery. The battery operated system can include more than one battery.

A fourth aspect of the invention is a battery operated system comprising a rechargeable battery, as described above, and a device with an electrical contact for contacting a side terminal of the battery to complete a circuit for providing electrical power from the battery to the device. The device contact for making electrical contact with the battery can be positioned so that it will only make contact with the battery side terminal if the battery is properly installed in the device, the battery has a side terminal and the side terminal is located in a particular portion of the side wall of the battery. The battery operated system can include more than one battery.

In an embodiment of a system powered by a rechargeable battery, the battery is rechargeable while installed in the device, by either a charger that is part of, or can be connected to, the device. In such an embodiment, the device has a charging contact that makes electrical contact with a side charging contact on the battery. The battery side charging contact is electrically connected to the side terminal. Preferably it is separated from the side terminal by a portion of the nonconductive covering on the battery side wall. With the battery side charging contact at a different longitudinal distance from an end of the battery than the side terminal, inadvertent charging of a primary battery installed in the device can be prevented. To complete the charging circuit, the battery can have a second charging contact located on the side of the battery, or the opposite polarity end power output terminal can serve as a charging contact as well.

In an embodiment of a battery operated system including a primary or rechargeable battery, the device has battery compartment with two recessed positive contacts for making electrical contact with the projecting positive terminal nubbin of the battery when the battery is installed in the compartment with the positive terminal in proximity to either of the positive contacts in the compartment. This embodiment avoids incorrect installation of the battery in the battery compartment, since the battery cannot be installed with reversed polarity (a common problem in devices using conventional cylindrical batteries with terminals on opposite ends) and the battery can power the device when installed with the positive terminal at either of two ends of the battery compartment. If the side terminal of the battery is located about midway between the ends of the battery, a single contact in the device can make electrical contact with the side terminal regardless of whether the battery is oriented with its positive terminal facing either recessed device contact. The same is true if the battery has two side terminals, each located about the same distance from opposite ends of the battery side wall.

In yet another embodiment of a battery operated system with a primary or rechargeable battery, the device has multiple contacts, each positioned to make electrical contact with a battery side terminal located in a different position on the side of the battery. In this embodiment a battery having any of several different characteristics or suitable ranges, each characteristic or range associated with a different side terminal location, can be installed in and used to operate the device, while excluding other battery types not having a side terminal in one of the proper locations.

A rechargeable battery according to the invention can also be recharged with a bidirectional battery charger that is able to charge the battery when put into the charger in either of two opposing orientations, in a manner similar to that used in the battery operated systems described above. This can be an added convenience and avoid user confusion and error in inserting a battery into the charger. The device uses two electrical contacts for applying a charging current to the battery, a charger side contact positioned to make electrical contact with a side charging contact on the battery, and one of two charger end contacts for making electrical contact with an opposite polarity battery end charging contact. A battery end power output terminal, electrically connected to the battery electrode having the polarity opposite as compared to that of the electrode to which the battery side charging contact is connected, can serve as the end charging contact for the battery. The two charger end contacts are positioned at opposite ends of the battery compartment in the charger so the battery end charging contact will be in electrical contact with one of the charger end contacts when the battery is in either of the opposing orientations.

In order to prevent short circuiting of the battery between the two charger end contacts, the charger can be configured so the charger end contacts cannot be able to make electrical contact with the battery terminal on the end opposite that of the battery end charging contact. This can be done by recessing the charger end contacts so they can only be contacted by a projecting nubbin on the battery end charging contact. The nubbin has a maximum width beyond the end of the battery side wall that is smaller than the minimum width of any projection from the battery terminal on the opposite end of the battery.

The battery side charging contact can also be a power output terminal, or the battery side charging contact can be separate from (i.e., separated by a portion of the electrically nonconductive jacket), but in electrical contact with, the battery side power output terminal. For example, both the side charging contact and the side power output terminal can be different exposed portions of a cell container. By having a separate side contact for charging the battery, the side charging contact can be positioned in a different location so a primary battery having a side power output terminal in the same location as that of the rechargeable battery cannot be charged by the charger.

If the battery side charging contact is about midway along the height of the side wall, only a single charger side contact is needed, regardless of the orientation of the battery. Alternatively, if the battery has two side charging contacts, each located about the same distance from opposite ends of the side wall, only a single charger side contact is needed.

In an embodiment of the bidirectional charger, the charger includes a magazine into which a plurality of batteries can be loaded. Because the batteries can be properly charged when in either of the two opposing orientations in the charger, the batteries can be loaded into the magazine in either of two opposing orientations. The batteries can be sequentially fed from the magazine into the battery compartment, recharged and removed. The magazine, battery compartment and charger contacts can be designed so only one battery size will fit, or they can be designed to accommodate more than one battery size. The charger can include a plurality of sets of channels, compartments and charging contacts, so a plurality of batteries, of either the same or different sizes, can be charged at the same time.

It will be understood by those who practice the invention and those skilled in the art that various modifications and improvements may be made to the invention without departing from the spirit of the disclose concept. The scope of protection afforded is to be determined by the claims and by the breadth of interpretation allowed by law.

The invention claimed is:

1. A rechargeable battery comprising at least one rechargeable electrochemical cell and at least three power output terminals, wherein:
   the battery has a first end, a second end, a side wall disposed between the first and second ends, a height, and a width that is smaller than the height;
   an electrically nonconductive covering is disposed on at least a portion of the side wall of the battery and on a peripheral portion of the first end;
   a first end power output terminal having a polarity is disposed on the first end of the battery and comprises a longitudinal projection beyond the battery side wall;
   a second end power output terminal having a polarity opposite that of the first end terminal is disposed on the second end of the battery, the second end terminal optionally having a longitudinal projection beyond the battery side wall, the optional projection having a minimum width beyond the side wall that is larger than a minimum width of the first end terminal projection beyond the side wall; and
   an exposed, recessed first side power output terminal having a polarity the same as that of the second end terminal is disposed on the side wall of the battery;
   wherein a portion of the first side terminal is disposed equidistant between longitudinally distal edges of the battery side wall.

2. The battery as defined in claim 1, wherein the first side terminal comprises a continuous band around a battery perimeter.

3. The battery as defined in claim 1, wherein the first side terminal is offset from a point midway between uppermost and lowermost edges of the battery side wall.

4. The battery as defined in claim 3, wherein the first side terminal is offset toward the second end, and no nonconductive covering is present between the second end and side terminals.

5. The battery as defined in claim 1, wherein the first side terminal is a sole side terminal.

6. The battery as defined in claim 1, wherein the battery has a second side power output terminal having the same polarity as the first side terminal disposed on the side wall of the battery and separated from the first side terminal by a portion of the nonconductive covering, the side wall has a first longitudinally distal edge in proximity to the first end of the battery and a second longitudinally distal edge in proximity to the second end of the battery, and a longitudinal distance from the first distal edge to the first side terminal is equal to a longitudinal distance from the second distal edge to the second side terminal.

7. The battery as defined in claim 1, wherein each cell in the battery has a nominal voltage of 1.2 to 1.5 volts.

8. The battery as defined in claim 7, wherein the battery has a nominal voltage of 1.2 to 1.5 volts.

* * * * *